(12) United States Patent
Chang et al.

(10) Patent No.: US 10,218,280 B2
(45) Date of Patent: Feb. 26, 2019

(54) POWER CONVERTER, SWITCH CONTROL CIRCUIT AND SHORT CIRCUIT DETECTION METHOD FOR CURRENT SENSING RESISTOR OF THE POWER CONVERTER

(71) Applicant: RICHTEK TECHNOLOGY CORPORATION, Chupei, HsinChu (TW)

(72) Inventors: Kuang-Fu Chang, Kaohsiung (TW); Tzu-Chen Lin, Changhua (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 128 days.

(21) Appl. No.: 15/052,444

(22) Filed: Feb. 24, 2016

(65) Prior Publication Data

US 2016/0268908 A1    Sep. 15, 2016

Related U.S. Application Data

(60) Provisional application No. 62/130,849, filed on Mar. 10, 2015.

(51) Int. Cl.
  *H02M 3/335*  (2006.01)
  *H02M 1/32*  (2007.01)
  *H02M 1/00*  (2006.01)

(52) U.S. Cl.
  CPC ......... *H02M 3/33523* (2013.01); *H02M 1/32* (2013.01); *H02M 2001/0009* (2013.01)

(58) Field of Classification Search
  CPC .............. H02M 1/32; H02M 3/33523; H02M 2001/0009; H02M 3/335; H02M 3/33507; H02H 7/1222
  USPC ....................................... 363/56.03
  See application file for complete search history.

(56) References Cited

U.S. PATENT DOCUMENTS

| 6,597,159 | B2  |  6/2003 | Yang |            |
|-----------|-----|---------|------|------------|
| 2007/0121349 | A1* | 5/2007 | Mednik ............. | H02M 3/33523 363/21.01 |
| 2008/0170420 | A1  | 7/2008 | Yang et al. | |
| 2009/0302827 | A1* | 12/2009 | Huang .............. | H02M 3/33507 324/76.11 |
| 2010/0320989 | A1* | 12/2010 | Chang ............... | H02M 3/33523 323/285 |

(Continued)

*Primary Examiner* — Harry Behm
*Assistant Examiner* — Lorena Bruner
(74) *Attorney, Agent, or Firm* — Tung & Associates (57) ABSTRACT

The present invention discloses a power converter, a switch control circuit, and a short circuit detection method for current sensing resistor of the power converter. The power converter includes: a transformer, a power switch, a current sensing resistor and a switch control unit. The current sensing resistor has one end coupled to the power switch and another end coupled to ground. The switch control unit generates the operation signal to control the power switch. The switch control unit generates a first sample-and-hold voltage at a first time point and a second sample-and-hold voltage at a second time point according to a voltage across the current sensing resistor. When a voltage difference between the first sample-and-hold voltage and the second sample-and-hold voltage is smaller than a reference voltage, it is determined that a short circuit occurs in the current sensing resistor.

15 Claims, 7 Drawing Sheets

(56) References Cited

U.S. PATENT DOCUMENTS

| | | | | |
|---|---|---|---|---|
| 2012/0153917 A1* | 6/2012 | Adell | ............... | H02M 3/1588 |
| | | | | 323/283 |
| 2012/0182328 A1* | 7/2012 | Yoon | ............... | G09G 5/10 |
| | | | | 345/690 |
| 2013/0293270 A1* | 11/2013 | Lee | ............... | H03K 5/00006 |
| | | | | 327/113 |

* cited by examiner

POWER CONVERTER, SWITCH CONTROL CIRCUIT AND SHORT CIRCUIT DETECTION METHOD FOR CURRENT SENSING RESISTOR OF THE POWER CONVERTER

CROSS REFERENCE

The present invention claims priority to U.S. Ser. No. 62/130,849, filed on Mar. 10, 2015.

BACKGROUND OF THE INVENTION

Field of Invention

The present invention relates to a power converter, a switch control circuit and a short circuit detection method for detecting a short circuit of a current sensing resistor of the power converter; particularly, it relates to such power converter, switch control circuit and short circuit detection method of the power converter, which are capable of effectively determining whether a short circuit occurs in the current sensing resistor of the power converter, to thereby avoid damages caused by the short circuit.

Description of Related Art

In prior art, when a short circuit occurs in a current sensing resistor (Rcs) of a power converter, if the power control IC does not activate a protection mechanism in time, the input current will increase rapidly. As a consequence, the current sensing resistor, the power switch and the power control IC may be seriously damaged.

However, to detect whether a short circuit occurs in the current sensing resistor, in certain applications, one cannot straight-forwardly comparing a voltage across the current sensing resistor with a predetermined reference value. For example, in many cases, the current sensing resistor is connected to another resistor and then connected to the power control IC. Under such circumstance, the actual value of the voltage across the current sensing resistor cannot be easily obtained by the power control IC because what the power control IC can obtain is a total voltage across the two resistors.

Thus, it is important to effectively determine whether a short circuit occurs in the current sensing resistor, in spite of the connection of the current sensing resistor.

In view of the above, to overcome the drawbacks in the prior art, the present invention proposes a power converter, a switch control circuit and a short circuit detection method of the power converter, which are capable of effectively determining whether a short circuit occurs in a current sensing resistor of the power converter, to thereby avoid damages caused by the short circuit.

SUMMARY OF THE INVENTION

From one perspective, the present invention provides a power converter, configured to operably convert an input voltage to an output voltage, the power converter comprising: an energy storing/releasing unit; a power switch, configured to be operably turned ON or OFF according to an operation signal, to control the energy storing/releasing unit, so that the input voltage is converted to the output voltage; a current sensing resistor having one end coupled to the power switch and having another end coupled to ground; and a switch control unit, configured to operably generate the operation signal, to control the power switch, wherein the switch control unit is coupled to the current sensing resistor, to receive a current sensing signal, so that the switch control unit samples-and-holds the current sensing signal to generate a first sample-and-hold voltage at a first time point and samples-and-holds the current sensing signal to generate a second sample-and-hold voltage at a second time point; and wherein when a voltage difference between the first sample-and-hold voltage and the second sample-and-hold voltage is smaller than a reference voltage, it is determined that a short circuit occurs in the current sensing resistor.

In one embodiment, the switch control unit further retrieves information related to the input voltage and adaptively adjusts the first time point and the second time point according to the information.

In one embodiment, the energy storing/releasing unit includes a transformer circuit or an inductor.

In one embodiment, the switch control unit includes a current sensing resistor short circuit detection circuit, when it is determined that a short circuit occurs in the current sensing resistor, the current sensing resistor short circuit detection circuit generates a current sensing resistor short circuit signal, wherein the current sensing resistor short circuit detection circuit includes: a delay time generation circuit, configured to operably generate the first time point and the second time point according to a signal related to the input voltage; a sample-and-hold circuit, configured to operably sample-and-hold the current sensing signal according to the first time point to generate the first sample-and-hold voltage and sample-and-hold the current sensing signal according to the second time point to generate the second sample-and-hold voltage; a summation circuit, configured to operably generates the voltage difference between the first sample-and-hold voltage and the second sample-and-hold voltage according to the first sample-and-hold voltage and the second sample-and-hold voltage; and a comparison circuit, configured to operably generate a comparison signal according to the voltage difference between the first sample-and-hold voltage and the second sample-and-hold voltage and the reference voltage.

In one embodiment, the current sensing resistor short circuit detection circuit further includes: a one shot logic circuit, configured to operably generate the current sensing resistor short circuit signal according to the comparison signal during a time period correlated to the operation signal.

In one embodiment, the power converter further comprises: a compensation resistor, coupled between the current sensing resistor and the switch control unit, wherein the compensation resistor is configured to operably generate an offset voltage.

From another perspective, the present invention provides a switch control unit of a power converter, wherein the power converter is configured to operably control an energy storing/releasing unit through a power switch, to convert an input voltage to an output voltage, the switch control unit comprising: an operation signal generation circuit, configured to operably generate the operation signal according to a feedback signal related to the output voltage and a current sensing signal related to a current flowing through the power switch, wherein the current sensing signal is related to a voltage across a current sensing resistor coupled to the power switch; and a current sensing resistor short circuit detection circuit, configured to operably sample-and-hold the current sensing signal to generate a first sample-and-hold voltage at a first time point and sample-and-hold the current sensing signal to generate a second sample-and-hold voltage at a second time point; wherein when a voltage difference between the first sample-and-hold voltage and the second sample-and-hold voltage is smaller than a reference voltage, it is determined that a short circuit occurs in the current sensing resistor.

In one embodiment, the switch control unit further retrieves information related to the input voltage and adaptively adjusts the first time point and the second time point according to the information.

In one embodiment, the current sensing resistor short circuit detection circuit includes: a delay time generation circuit, configured to operably generate the first time point and the second time point according to a signal related to the input voltage; a sample-and-hold circuit, configured to operably samples-and-holds the current sensing signal according to the first time point to generate the first sample-and-hold voltage and samples-and-holds the current sensing signal according to the second time point to generate the second sample-and-hold voltage; a summation circuit, configured to operably generates the voltage difference between the first sample-and-hold voltage and the second sample-and-hold voltage according to the first sample-and-hold voltage and the second sample-and-hold voltage; and a comparison circuit, configured to operably generate a comparison signal according to the voltage difference between the first sample-and-hold voltage and the second sample-and-hold voltage and the reference voltage.

In one embodiment, the current sensing resistor short circuit detection circuit further includes: a one shot logic circuit, configured to operably generate the current sensing resistor short circuit signal according to the comparison signal during a time period correlated to the operation signal.

From yet another perspective, the present invention provides a power converter, configured to operably convert an input voltage to an output voltage, the power converter comprising: an energy storing/releasing unit; a power switch, configured to be operably turned ON or OFF according to an operation signal, to control the energy storing/releasing unit, so that the input voltage is converted to the output voltage; a current sensing resistor having one end coupled to the power switch and having another end coupled to ground; and a switch control unit, configured to operably generate the operation signal, to control the power switch, wherein the switch control unit is coupled to the current sensing resistor, to receive a current sensing signal, and wherein the switch control unit starts counting when the current sensing signal reaches a first reference voltage, and the switch control unit ends counting when the current sensing signal reaches a second reference voltage; wherein when the count reaches a predetermined threshold, it is determined that a short circuit occurs in the current sensing resistor.

In one embodiment, the switch control unit adaptively adjusts the first reference voltage, the second reference voltage and/or the predetermined time in response to different input voltages.

From still another perspective, the present invention provides a current sensing resistor short circuit detection method for a power converter, wherein the power converter is configured to operably control an energy storing/releasing unit through a power switch, to convert an input voltage to an output voltage, the power converter including a current sensing resistor coupled to the power switch, the current sensing resistor short circuit detection method comprising: sampling-and-holding a current sensing signal, to generate a first sample-and-hold voltage at a first time point and to generate a second sample-and-hold voltage at a second time point, wherein the first time point and the second time point are correlated to the input voltage, and wherein the current sensing signal is related to a voltage across a current sensing resistor coupled to the power switch; and wherein when a voltage difference between the first sample-and-hold voltage and the second sample-and-hold voltage is smaller than a reference voltage, it is determined that a short circuit occurs in the current sensing resistor.

In one embodiment, the current sensing resistor short circuit detection method further comprises: generating an input voltage related signal according to information related to the input voltage; and adaptively adjusting the first time point and the second time point according to the input voltage related signal.

In one embodiment, when it is determined that a short circuit occurs in the current sensing resistor, the current sensing resistor short circuit detection method further performs at least one of the following steps: (1) turning OFF the power switch; (2) instructing the power converter to shut down; or (3) counting the current sensing resistor short circuit signal, and when the count reaches a threshold, instructing the power converter to shut down.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and devices, but not drawn according to actual scale.

Figure 1:
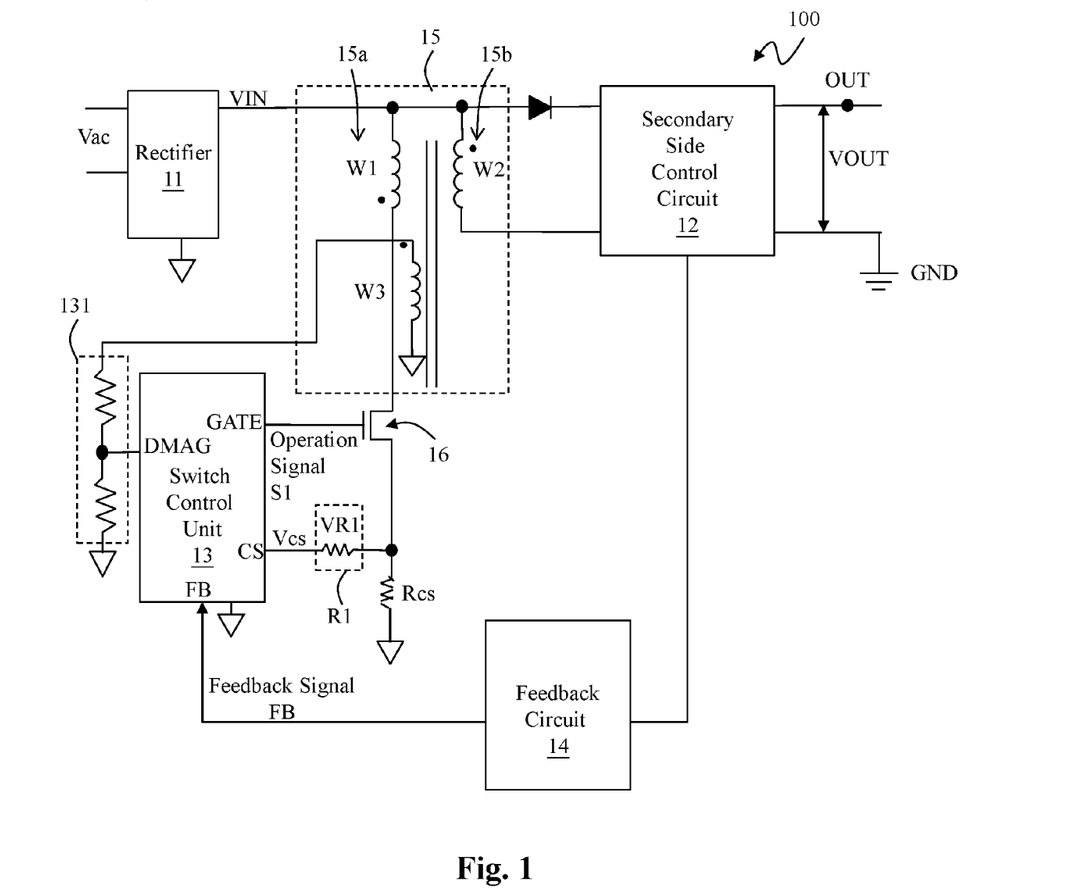
FIG. 1 shows a block diagram of a power converter according to an embodiment of the present invention.

Please refer to FIG. 1, which shows a block diagram of a power converter according to an embodiment of the present invention. In this embodiment, the power converter 100 is for example but not limited to an isolated type AC-DC converter. The power converter 100 can be any other type of power converter. In the embodiment of an isolated type AC-DC converter, the power converter 100 is operable to convert an input voltage VIN to an output voltage VOUT. The power converter 100 comprises: a transformer 15, a power switch 16, a current sensing resistor Rcs and a switch control unit 13. The switch control unit 13 can be manufactured to be, for example but not limited to, an integrated circuit. In addition, the power converter 100 can optionally comprises a secondary side control circuit 12, a feedback circuit 14 and a compensation resistor R1; the compensation resistor R1 is connected between the current sensing resistor Rcs and the switch control unit 13. Because the isolated type AC-DC converter is well known to those skilled in the art, for the sake of simplicity in the figures, only the circuit details relevant to the present invention are illustrated, while the other circuit details irrelevant to the present invention are omitted.

Note that the power converter 100 is not limited to the isolated type AC-DC converter; it can be another type of switching power converter such as a synchronous and asynchronous boost, buck, buck-boost and inverting switching power converter, as shown in FIGS. 8A-8J. In these shown switching power converters (including the isolated type AC-DC converter), they all include a switch control unit (not shown in FIGS. 8A-8J), which controls at least one power switch according to a feedback signal (not shown in FIGS. 8A-8J) related to an output voltage, and the power switch controls an energy storing/releasing unit (e.g., a transformer or an inductor) so as to convert an input voltage VIN to an output voltage VOUT. The present invention can be applied to any such type of switching power converter.

The transformer 15 includes a primary winding W1, a secondary winding W2 and a tertiary winding W3. The primary winding W1 is at a primary side 15a of the transformer 15, for receiving the input voltage VIN. The secondary winding W2 is at a secondary side 15b of the transformer 15, for generating the output voltage VOUT at an output terminal OUT. The tertiary winding W3 is at a primary side 15a of the transformer 15, for generating information related to the input voltage VIN according to the input voltage VIN. In one embodiment, the input voltage VIN can be generated from an alternating power supply Vac through a rectifier 11.

The power switch 16 is coupled to the primary winding W1 of the transformer 15 and is turned ON or OFF according to an operation signal S1, to control a current flowing through the primary winding W1, so that the input voltage VIN is converted to the output voltage VOUT through induction between the primary winding W1 and the secondary winding W2.

Figure 2:
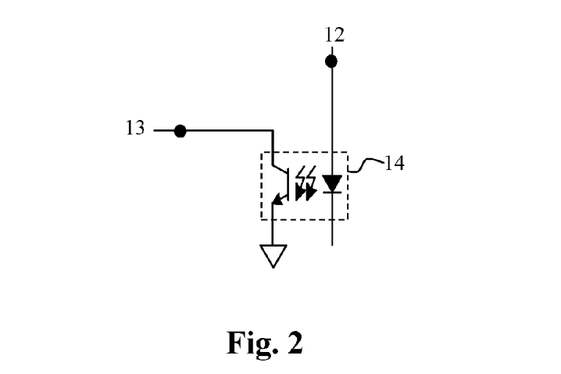
FIG. 2 shows an embodiment of a feedback circuit 14.

The switch control unit 13 is configured to operably generate the operation signal S1 (which is outputted from an operation signal terminal GATE of the switch control unit 13), to control the power switch 16. In this embodiment, the switch control unit 13 generates the operation signal S1 according to a feedback signal FB which is received from a feedback signal terminal of the switch control unit 13 and a current sensing signal Vcs which is received from a current sensing terminal CS of the switch control unit 13. In other embodiments, when the power converter 100 is another type of switching power converter, the switch control unit 13 can generate the operation signal S1 through a similar or different feedback control loop. And, because the power converter 100 of this embodiment is an isolated type AC-DC converter, in one embodiment, the feedback circuit 14 can correspondingly be an isolated type feedback circuit which is for example but not limited to an opto-coupler circuit as shown in FIG. 2. When the power converter 100 is another type of switching power converter, the feedback circuit 14 can be another type of feedback circuit (e.g., a resistor voltage divider circuit) or can even be omitted. And, likewise, when the power converter 100 is another type of switching power converter, the secondary side control circuit 12 can be omitted.

The current sensing resistor Rcs is configured to operably sense the current flowing through the power switch 16. The current sensing resistor Rcs has one end coupled to the power switch and has another end coupled to ground. In this embodiment, a compensation resistor R1 can be optionally connected between the current sensing resistor Rcs and the switch control unit 13. The compensation resistor R1 which is coupled between the current sensing resistor Rcs and the current sensing terminal CS of the switch control unit 13 is for generating an offset voltage VR1, to adjust the current sensing signal received by the switch control unit 13. For example, the power converter 100 may be applied to different applications of different input voltages VIN (e.g., 90V~265V), and the current amounts flowing through the power switch 16 are accordingly different. However, the internal parameters of the switch control unit 13 are fixed and cannot be changed in response to different input voltages VIN. Therefore, by adopting a compensation resistor R1 (which compensates the current sensing signal Vcs), the same switch control unit 13 having fixed internal parameters can be applied to different applications of different input voltages VIN. Nevertheless, the present invention can also be applied to the circumstance where there is no such compensation resistor R1.

Although connecting a compensation resistor R1 between the current sensing resistor Rcs and the switch control unit 13 provides the flexibility that the switch control unit 13 can be applied to different applications of different input voltages VIN, the offset voltage across the compensation resistor R1 will cause the switch control unit 13 to be unable to accurately sense the actual voltage across the current sensing resistor Rcs. Thus, in the prior art, if a short circuit occurs in the current sensing resistor Rcs, the prior art cannot accurately detect the short circuit.

To overcome this drawback, in the present invention, the switch control unit 13 is configured to, according to the current sensing signal Vcs (which is received from the current sensing terminal CS of the switch control unit 13), operably generate a first sample-and-hold voltage Vcs1 at a first time point T1 and a second sample-and-hold voltage Vcs2 at a second time point T2 (referring to FIG. 5; details will be described later), so that a short circuit occurring in the current sensing resistor Rcs can be detected. Besides, if the power converter 100 is applied to different applications of different input voltages VIN, according to the present invention, the switch control unit 13 can further adjust its judgment according to information related to the input voltage VIN. The details as to how the present invention determines whether a short circuit occurs in the current sensing resistor Rcs will be described later.

Figure 3:
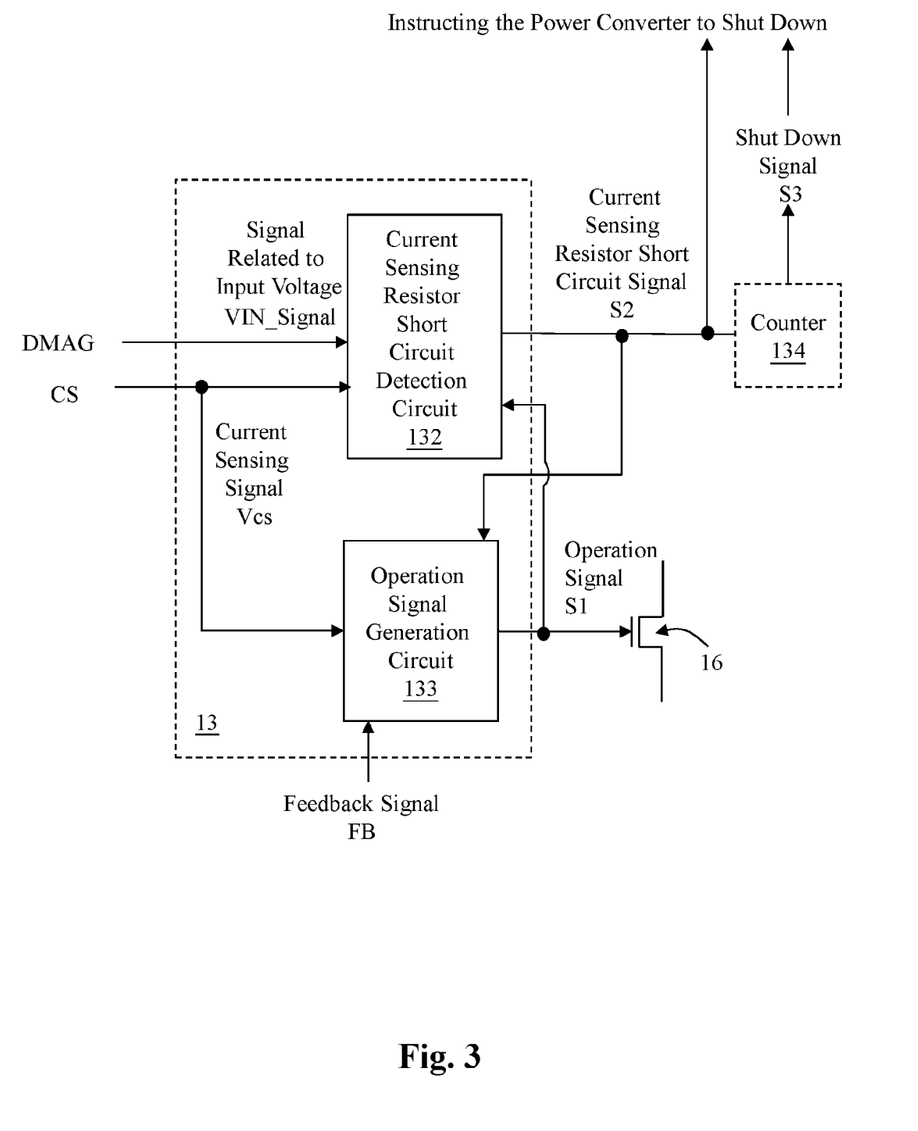
FIG. 3 shows a specific embodiment of a switch control unit 13.
Figure 4:
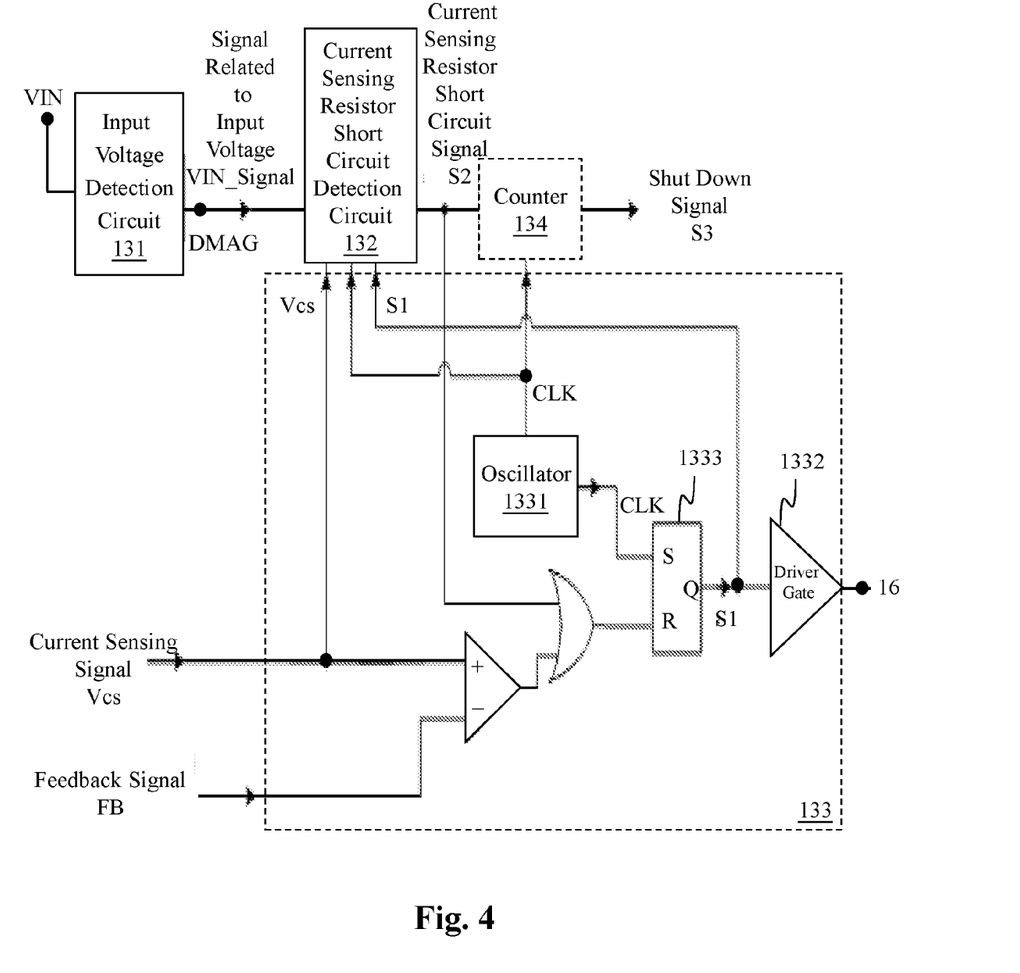
FIG. 4 shows a specific embodiment of an operation signal generation circuit 133.

Please refer both to FIG. 3 and FIG. 4. FIG. 3 shows a specific embodiment of a switch control unit 13. FIG. 4 shows a specific embodiment of an operation signal generation circuit 133.

As shown in FIG. 3, the switch control unit 13 includes: a current sensing resistor short circuit detection circuit 132 and an operation signal generation circuit 133. In this embodiment, it is assumed that the power converter 100 may be applied to different applications of different input voltages VIN, so the switch control unit 13 receives information related to the input voltage VIN from its input voltage terminal DMAG. such information related to the input voltage VIN can be retrieved via, for example but not limited to, an input voltage detection circuit 131 (as one embodiment of the input voltage detection circuit 131, please refer to FIG. 1).

The operation signal generation circuit 133 generates the operation signal S1 according to the feedback signal FB, the current sensing signal Vcs and a current sensing resistor short circuit signal S2. When it is determined that a short circuit occurs in the current sensing resistor Rcs, the current sensing resistor short circuit detection circuit 132 will generate the current sensing resistor short circuit signal S2. When the current sensing resistor short circuit signal S2 is generated, the present invention will perform, for example but not limited to, one or more of the following three operations: (1) the power converter 100 can turn OFF the power switch 16; (2) the power converter 100 can immediately shut down; or (3) to better guard against a false alarm caused by noises, the current sensing resistor short circuit signal S2 can be inputted into a counter 134, and when the count of the counter 134 reaches a threshold, a shutdown signal S3 is generated, instructing the power converter 100 to shut down.

FIG. 4 shows an illustrative example as to how the operation signal generation circuit 133 generates the operation signal S1 according to the feedback signal FB, the current sensing signal Vcs and the current sensing resistor short circuit signal S2. As shown in FIG. 4, in one embodiment, the operation signal generation circuit 133 comprises: an oscillator 1331, a latch 1333, a driver gate 1332, and other logic circuits, which cooperate to generate the operation signal S1. The oscillator 1331, the latch 1333 and the driver gate 1332 are well known circuits to those skilled on the art, so they are not redundantly explained here.

Figure 5:
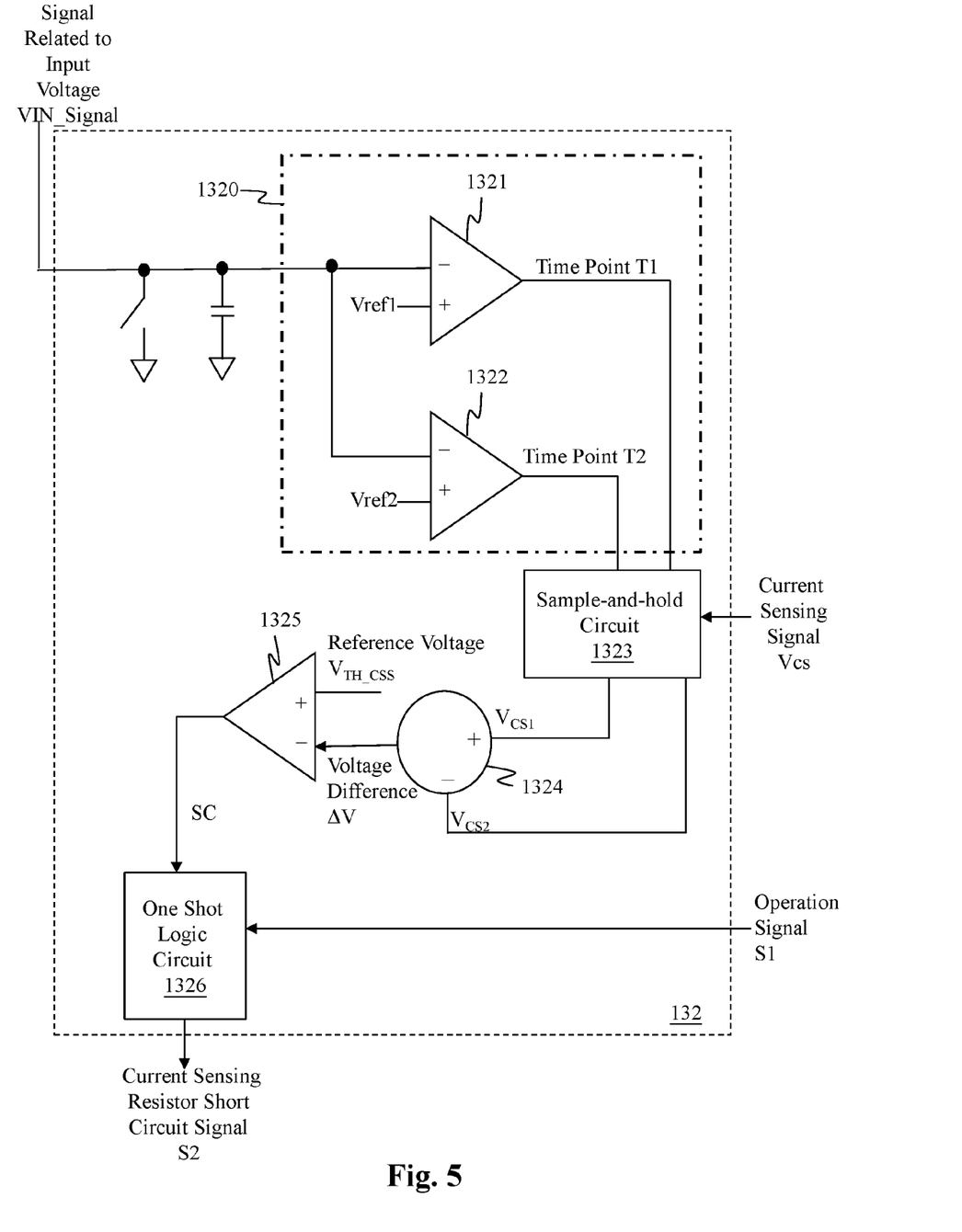
FIG. 5 shows a specific embodiment of a current sensing resistor short circuit detection circuit 132.

Please refer both to FIG. 3 and FIG. 5. FIG. 5 shows a specific embodiment of a current sensing resistor short circuit detection circuit 132.

In this embodiment, whether a short circuit occurs in the current sensing resistor Rcs is determined as thus: when a voltage difference ΔV between the first sample-and-hold voltage Vcs1 and the second sample-and-hold voltage Vcs2 is smaller than a reference voltage VTH_CSS, it is determined that a short circuit occurs in the current sensing resistor Rcs.

FIG. 5 shows an illustrative example as to how the current sensing resistor short circuit detection circuit 132 generates the current sensing resistor short circuit signal S2. As shown in FIG. 5, the current sensing resistor short circuit detection circuit 132 includes a delay time generation circuit 1320, a sample-and-hold circuit 1323, a summation circuit 1324, a comparison circuit 1325 and a one shot logic circuit 1326.

In this embodiment, the current sensing resistor short circuit detection circuit 132 generates the first sample-and-hold voltage Vcs1 at the first time point T1 and the second sample-and-hold voltage Vcs2 at the second time point T2 according to the current sensing signal Vcs and a signal related to the input voltage VIN_Signal. The signal related to the input voltage VIN_Signal for example can be the input voltage VIN itself, or a divided voltage of the input voltage VIN.

To be more specific, in this embodiment, the delay time generation circuit 1320 of the current sensing resistor short circuit detection circuit 132 includes a comparison circuit 1321 and a comparison circuit 1322. The comparison circuit 1321 generates the first time point T1 according to the signal related to the input voltage VIN_Signal and a reference voltage Vref1, wherein the first time point T1 represents a time point where the signal related to the input voltage VIN_Signal reaches the reference voltage Vref1. The comparison circuit 1322 generates the second time point T2 according to the signal related to the input voltage VIN_Signal and a reference voltage Vref2, wherein the second time point T2 represents a time point where the signal related to the input voltage VIN_Signal reaches the reference voltage Vref2. The purpose for such arrangement is to correlate the first time point T1 and the second time point T2 to the input voltage VIN, so that the power converter 100 can be applied to different applications of different input voltages VIN. However, if the power converter 100 is applied for receiving only one fixed input voltage VIN, then the first time point T1 and the second time point T2 can be set to predetermined values.

The sample-and-hold circuit 1323 samples-and-holds the current sensing signal Vcs at the first time point T1 to generate the first sample-and-hold voltage Vcs1 and samples-and-holds the current sensing signal Vcs at the second time point T2 to generate the second sample-and-hold voltage Vcs2.

The summation circuit 1324 generates the voltage difference ΔV between the first sample-and-hold voltage Vcs1 and the second sample-and-hold voltage Vcs2.

The comparison circuit 1325 generates a comparison signal SC according to the voltage difference ΔV between the first sample-and-hold voltage Vcs1 and the second sample-and-hold voltage Vcs2 and the reference voltage VTH_CSS. In one embodiment, the generated comparison signal SC can be the above-mentioned current sensing resistor short circuit signal S2.

In another embodiment, the current sensing resistor short circuit detection circuit 132 can further include a one shot logic circuit 1326, which is configured to operably generate the current sensing resistor short circuit signal S2 according to the comparison signal SC and the operation signal S1. That is, the current sensing resistor short circuit signal S2 is generated at a time point which is related to the operation signal S1, such that when the operation signal S1 turns OFF the power switch 16, the current sensing resistor short circuit signal S2 is not generated, to avoid misjudgments.

In this embodiment, the reference voltage VTH_CSS represents a safety lower limit of the current sensing signal Vcs; in another embodiment, the reference voltage VTH_CSS can be a predetermined value determined for another purpose.

Figure 6:
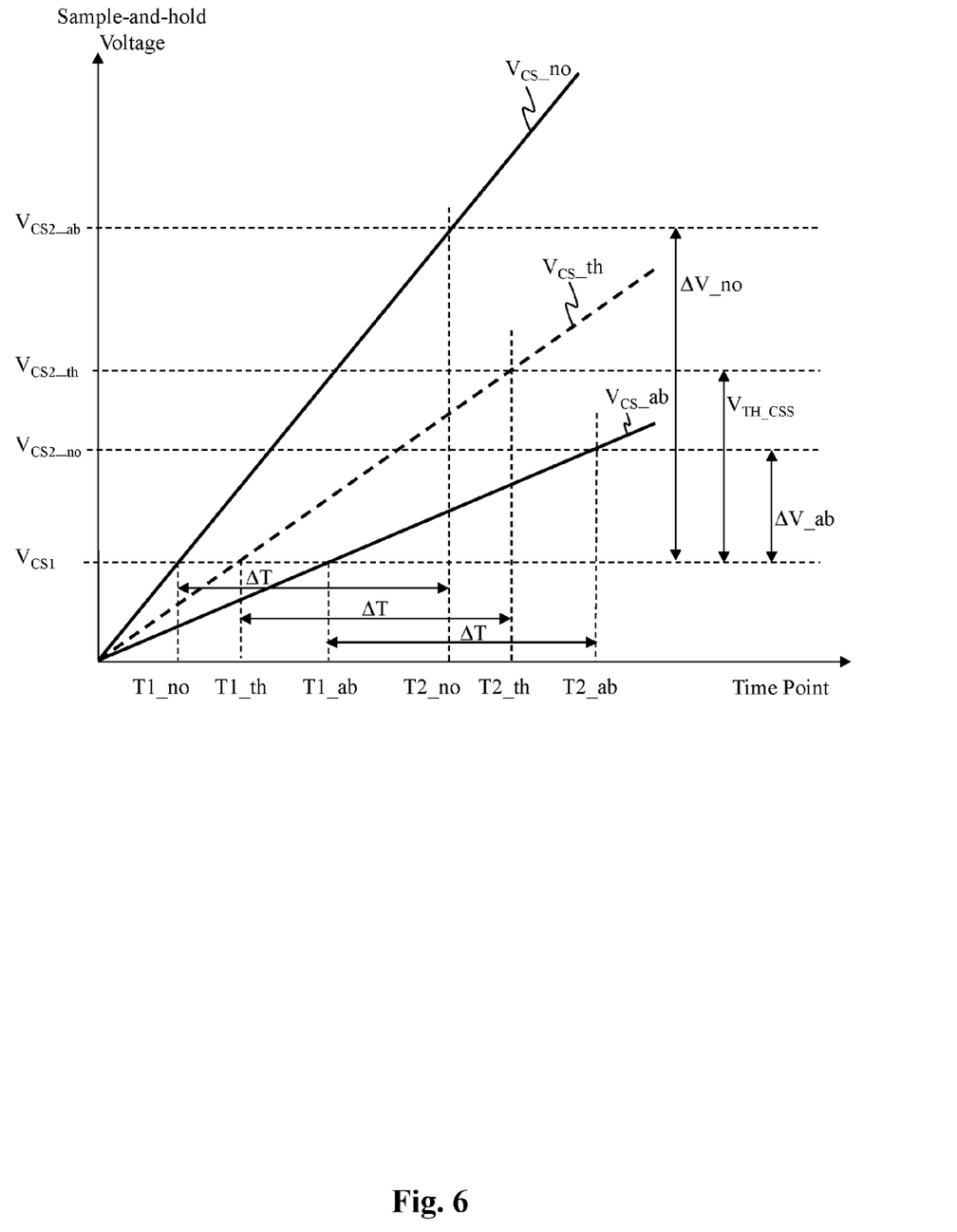
FIG. 6 shows relationships between sample-and-hold voltages and time when the current sensing resistor is in normal condition and in short circuit condition.

FIG. 6 shows the relationships between the sample-and-hold voltages and time when the current sensing resistor is in normal condition and in short circuit condition, to explain how the above-mentioned circuits determine whether a short circuit occurs in the current sensing resistor Rcs. According to the present invention, if the voltage difference ΔV between the first sample-and-hold voltage Vcs1 and the second sample-and-hold voltage Vcs2 is smaller than the reference voltage VTH_CSS, it indicates that the resistance of the current sensing resistor Rcs is too small, and therefore it can be determined that a short circuit has occurred in the current sensing resistor Rcs. As shown in FIG. 6, a current sensing threshold VCS_th can be predetermined. At a first time point T1_th, the current sensing threshold VCS_th has a corresponding first sample-and-hold voltage Vcs1_th, and at a second time point T2_th, the current sensing threshold VCS_th has a corresponding second sample-and-hold voltage Vcs2_th. The voltage difference between the second sample-and-hold voltage Vcs2_th and the first sample-and-hold voltage Vcs1_th is the reference voltage VTH_CSS. Under normal condition, as shown by the normal current sensing signal VCS_no, the voltage difference between the second sample-and-hold voltage Vcs2_no at the second time point T2_no and the first sample-and-hold voltage Vcs1_no at the first time point T1_no should be greater than the reference voltage VTH_CSS. Thus, under such circumstance, the current sensing resistor short circuit detection circuit 132 does not generate the current sensing resistor short circuit signal S2.

On the other hand, under abnormal condition, as shown by the abnormal current sensing signal VCS_ab, the voltage difference between the second sample-and-hold voltage Vcs2_ab at the second time point T2_ab and the first sample-and-hold voltage Vcs1_ab at the first time point T1_ab is smaller than the reference voltage VTH_CSS. Hence, under such circumstance, the current sensing resistor short circuit detection circuit 132 will generate the current sensing resistor short circuit signal S2.

Note that in one embodiment of the present invention, the first time point T1 and the second time point T2 can be adaptively adjusted in response to different input voltages VIN. Please refer to FIG. 7.

Figure 7:
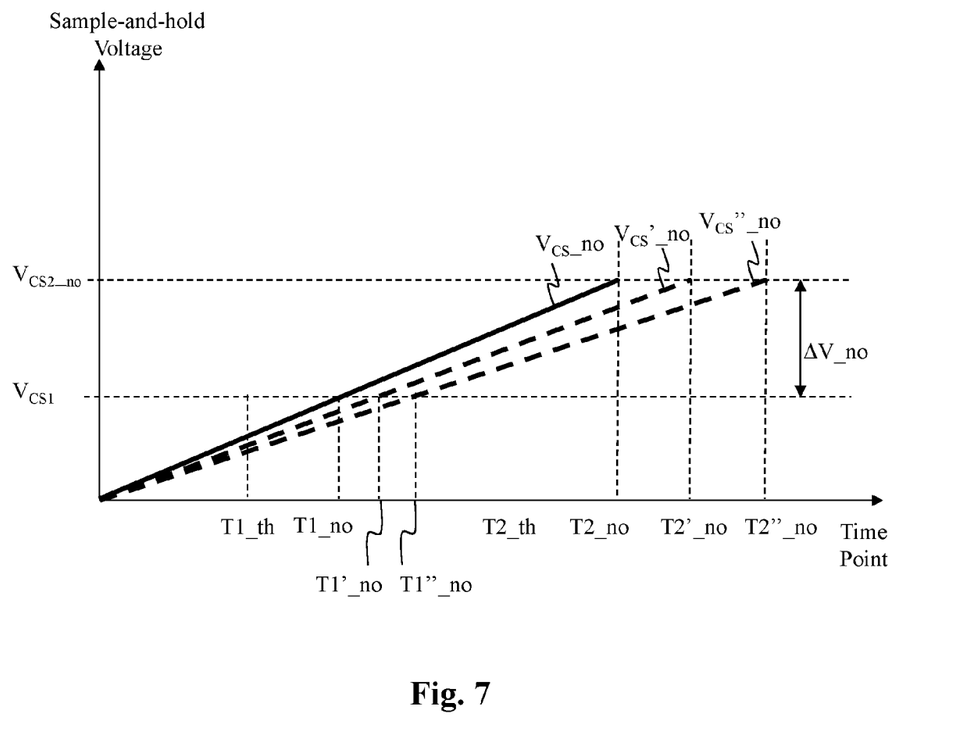
FIG. 7 shows that the first and second time points can be set according to the level of the input voltage.
Figure 8A:
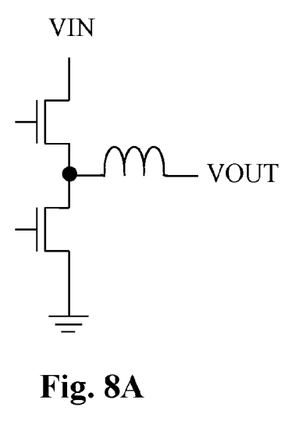
FIGS. 8A-8J show various types of switching power converters.
Figure 8B:
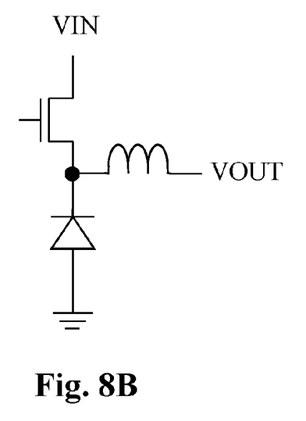
Figure 8C:
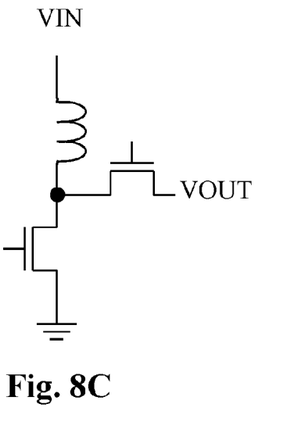
Figure 8D:
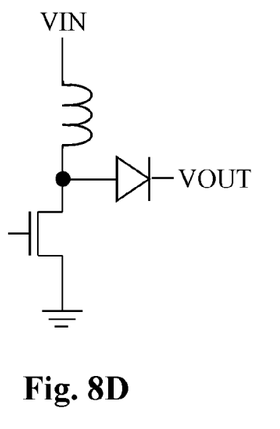
Figure 8E:
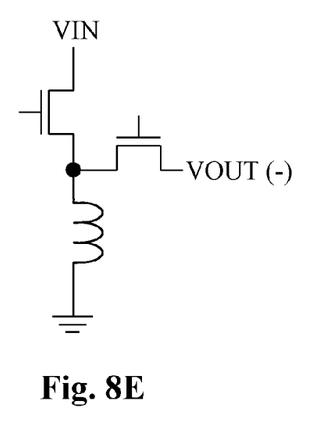
Figure 8F:
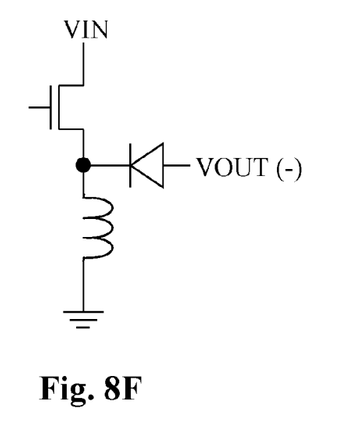
Figure 8G:
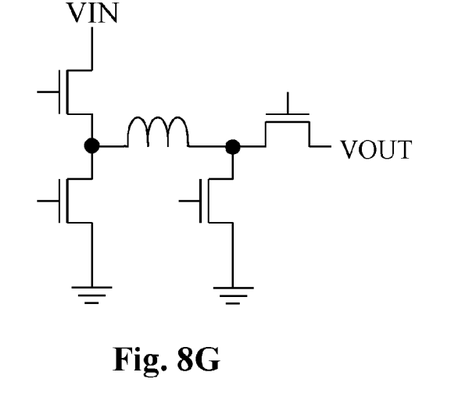
Figure 8H:
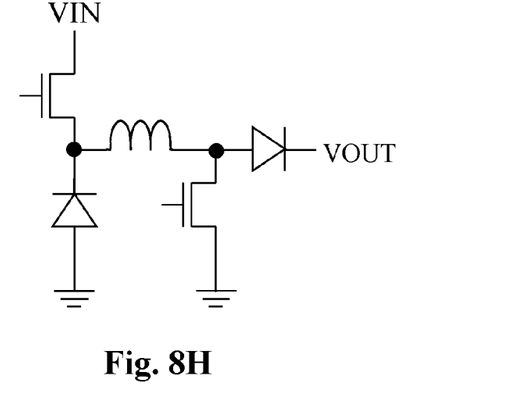
Figure 8I:
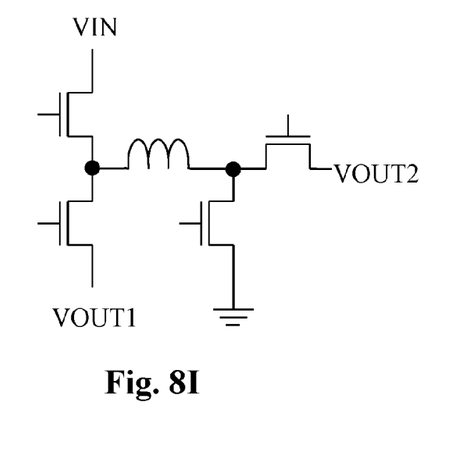
Figure 8J:
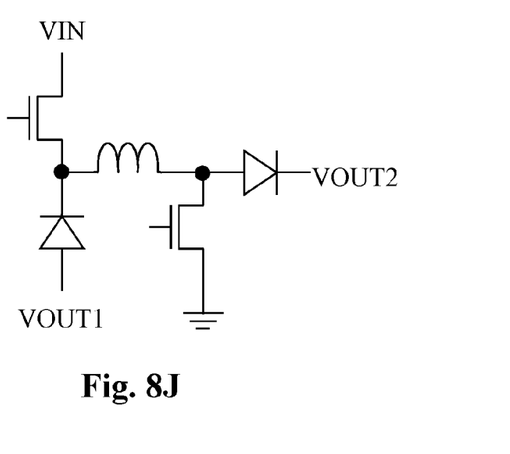

FIG. 7 shows that the first time point and the second time point are adaptively adjusted in response to different input voltages VIN. A different input voltage VIN will result in a different slope of the current sensing signal Vcs. Therefore, when the input voltage VIN is relatively higher, the time period between the first time point and the second time point can be relatively shorter, while when the input voltage VIN is relatively lower, the time period between the first time point and the second time point can be relatively longer. This is why the delay time generation circuit 1320 in FIG. 5 generates the first time point T1 and the second time point T2 according to the signal related to the input voltage VIN_Signal. For example, referring to FIG. 7, in the normal current sensing signal VCS_no which corresponds to a relatively highest input voltage VIN, the time period between the first time point T1_no and the second time point T2_no is relatively shortest. In the normal current sensing signal threshold VCS'_no which corresponds to a relatively higher but not highest input voltage VIN, the time period between the first time point T1'_no and the second time point T2'_no is slightly longer. In the normal current sensing signal threshold VCS"_no which corresponds to a relatively lowest input voltages VIN, the time period between the first time point T1"_no and the second time point T2"_no is relatively longest.

The above embodiments follow the approach "setting two time points and determining whether a short circuit occurs according to a voltage difference between two voltages corresponding to these two time points". However, please note that this is equivalent to "setting two voltages and determining whether a short circuit occurs according to a time difference between two time points corresponding to these two voltages". The circuit implementation for the latter is more complicated than the former, but still doable. In one embodiment, the latter can be implemented as thus. The current sensing signal Vcs can be compared with two reference voltages (i.e., a first reference voltage and a second reference voltage). When the current sensing signal Vcs reaches the first reference voltage, start counting. If the time period from the current sensing signal Vcs reaching the first reference voltage to the current sensing signal Vcs reaching the second reference voltage is too long (e.g., a time period threshold can be predetermined; when the count indicates reaching the predetermined time period threshold), the current sensing resistor short circuit signal S2 will be generated. Note that, the first reference voltage, the second reference voltage and the predetermined time period threshold can be adaptively adjusted in response to different input voltages VIN.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:
1. A power converter, configured to operably convert an input voltage to an output voltage, the power converter comprising:
   an energy storing/releasing unit;
   a power switch, configured to be operably turned ON or OFF according to an operation signal, to control the energy storing/releasing unit, so that the input voltage is converted to the output voltage;
   a current sensing resistor having one end coupled to the power switch and having another end coupled to ground; and
   a switch control unit, configured to operably generate the operation signal, to control the power switch, wherein the switch control unit is coupled to the current sensing resistor, to receive a current sensing signal, so that the switch control unit samples-and-holds the current sensing signal to generate a first sample-and-hold voltage at a first time point and samples-and-holds the current sensing signal to generate a second sample-and-hold voltage at a second time point, the second time point being after the first time point, wherein the first sample-and-hold voltage indicates a first condition of the current sensing signal at the first time point, and the second sample-and-hold voltage indicates a second condition of the current sensing signal at the second time point;
   wherein the switch control unit includes a current sensing resistor short circuit detection circuit, and when it is determined that a short circuit occurs in the current sensing resistor, the current sensing resistor short circuit detection circuit generates a current sensing resistor short circuit signal, wherein the current sensing resistor short circuit detection circuit compares a voltage difference between the first sample-and-hold voltage generated at the first time point and the second sample-and-hold voltage generated at the second time point with a reference voltage to determine whether a short circuit occurs in the current sensing resistor, whereby when the voltage difference between the first sample-and-hold voltage and the second sample-and- hold voltage is smaller than the reference voltage, it is determined that the short circuit occurs in the current sensing resistor.

2. The power converter of claim 1, wherein the switch control unit further retrieves information related to the input voltage and adaptively adjusts the first time point and the second time point according to the information.

3. The power converter of claim 2, wherein the current sensing resistor short circuit detection circuit includes:
   a delay time generation circuit, configured to operably generate the first time point and the second time point according to a signal related to the input voltage;
   a sample-and-hold circuit, configured to operably sample-and-hold the current sensing signal according to the first time point to generate the first sample-and-hold voltage and sample-and-hold the current sensing signal according to the second time point to generate the second sample-and-hold voltage;
   a summation circuit, configured to operably generates the voltage difference between the first sample-and-hold voltage and the second sample-and-hold voltage; and
   a comparison circuit, configured to operably generates a comparison signal according to the voltage difference between the first sample-and-hold voltage and the second sample-and-hold voltage and the reference voltage.

4. The power converter of claim 3, wherein the current sensing resistor short circuit detection circuit further includes:
   a one shot logic circuit, configured to operably generate the current sensing resistor short circuit signal according to the comparison signal during a time period correlated to the operation signal.

5. The power converter of claim 1, wherein the energy storing/releasing unit includes a transformer or an inductor.

6. The power converter of claim 1, further comprising:
   a compensation resistor, coupled between the current sensing resistor and the switch control unit, wherein the compensation resistor is configured to operably generate an offset voltage.

7. A switch control unit of a power converter, wherein the power converter is configured to operably control an energy storing/releasing unit through a power switch, to convert an input voltage to an output voltage, the switch control unit comprising:
   an operation signal generation circuit, configured to operably generate the operation signal according to a feedback signal related to the output voltage and a current sensing signal related to a current flowing through the power switch, wherein the current sensing signal is related to a voltage across a current sensing resistor coupled to the power switch; and
   a current sensing resistor short circuit detection circuit, configured to operably sample-and-hold the current sensing signal to generate a first sample-and-hold voltage at a first time point and sample-and-hold the current sensing signal to generate a second sample-and-hold voltage at a second time point, the second time point being after the first time point, and configured to compare a voltage difference between the first sample-and-hold voltage and the second sample-and-hold voltage with a reference voltage to determine whether a short circuit occurs in the current sensing resistor, wherein the first sample-and-hold voltage indicates a first condition of the current sensing signal at the first time point, and the second sample-and-hold voltage indicates a second condition of the current sensing signal at the second time point;
   wherein when the voltage difference between the first sample-and-hold voltage generated at the first time point and the second sample-and-hold voltage generated at the second time point is smaller than the reference voltage, it is determined that the short circuit occurs in the current sensing resistor.

8. The switch control unit of the power converter of claim 7, wherein the switch control unit further retrieves information related to the input voltage and adaptively adjusts the first time point and the second time point according to the information.

9. The switch control unit of the power converter of claim 8, wherein the current sensing resistor short circuit detection circuit includes:
   a delay time generation circuit, configured to operably generate the first time point and the second time point according to a signal related to the input voltage;
   a sample-and-hold circuit, configured to operably sample-and-hold the current sensing signal according to the first time point to generate the first sample-and-hold voltage and sample-and-hold the current sensing signal according to the second time point to generate the second sample-and-hold voltage;
   a summation circuit, configured to operably generates the voltage difference between the first sample-and-hold voltage and the second sample-and-hold voltage according to the first sample-and-hold voltage and the second sample-and-hold voltage; and
   a comparison circuit, configured to operably generate a comparison signal according to the voltage difference between the first sample-and-hold voltage and the second sample-and-hold voltage and the reference voltage.

10. The switch control unit of the power converter of claim 9, wherein the current sensing resistor short circuit detection circuit further includes:
    a one shot logic circuit, configured to operably generates the current sensing resistor short circuit signal according to the comparison signal during a time period correlated to the operation signal.

11. A power converter, configured to operably convert an input voltage to an output voltage, the power converter comprising:
    an energy storing/releasing unit;
    a power switch, configured to be operably turned ON or OFF according to an operation signal, to control the energy storing/releasing unit, so that the input voltage is converted to the output voltage;
    a current sensing resistor having one end coupled to the power switch and having another end coupled to ground; and
    a switch control unit, configured to operably generate the operation signal, to control the power switch, wherein the switch control unit is coupled to the current sensing resistor, to receive a current sensing signal, and wherein the switch control unit starts counting when the current sensing signal reaches a predetermined first reference voltage, and the switch control unit ends counting when the current sensing signal reaches a predetermined second reference voltage, wherein the predetermined second reference voltage is different from the predetermined first reference voltage;
    wherein when the count reaches a predetermined threshold, it is determined that a short circuit occurs in the current sensing resistor.

12. The power converter of claim 11, wherein the switch control unit adaptively adjusts the first reference voltage, the second reference voltage and/or the predetermined time in response to different input voltages.

13. A current sensing resistor short circuit detection method for a power converter, wherein the power converter is configured to operably control an energy storing/releasing unit through a power switch, to convert an input voltage to an output voltage, the power converter including a current sensing resistor coupled to the power switch, the current sensing resistor short circuit detection method comprising:

sampling-and-holding a current sensing signal, to generate a first sample-and-hold voltage at a first time point and to generate a second sample-and-hold voltage at a second time point, the second time point being after the first time point, wherein the first time point and the second time point are correlated to the input voltage, and wherein the current sensing signal is related to a voltage across a current sensing resistor coupled to the power switch, wherein the first sample-and-hold voltage indicates a first condition of the current sensing signal at the first time point, and the second sample-and-hold voltage indicates a second condition of the current sensing signal at the second time point; and comparing a voltage difference between the first sample-and-hold voltage generated at the first time point and the second sample-and-hold voltage generated at the second time point with a reference voltage to determine whether a short circuit occurs in the current sensing resistor;

wherein when the voltage difference between the first sample-and-hold voltage and the second sample-and-hold voltage is smaller than the reference voltage, it is determined that the short circuit occurs in the current sensing resistor.

14. The current sensing resistor short circuit detection method of claim 13, further comprising:

generating an input voltage related signal according to the information related to the input voltage; and adaptively adjusting the first time point and the second time point according to the input voltage related signal.

15. The current sensing resistor short circuit detection method of claim 13, wherein when it is determined that a short circuit occurs in the current sensing resistor, the current sensing resistor short circuit detection method further performs at least one of the following steps:

(1) turning OFF the power switch;
(2) instructing the power converter to shut down; or
(3) counting the current sensing resistor short circuit signal, and when the count reaches a threshold, instructing the power converter to shut down.

* * * * *